US009696818B2

(12) United States Patent
Lal et al.

(10) Patent No.: US 9,696,818 B2
(45) Date of Patent: Jul. 4, 2017

(54) BIDIRECTIONAL TEXT SELECTION

(71) Applicant: Adobe Systems Incorporated, San Jose, CA (US)

(72) Inventors: Rakesh Lal, Ghaziabad (IN); Margie Vogel, Seattle, WA (US); Irfan Ahmad, Dist. Siddhartha Nagar (IN)

(73) Assignee: Adobe Systems Incorporated, San Jose, CA (US)

(*) Notice: Subject to any disclaimer, the term of this patent is extended or adjusted under 35 U.S.C. 154(b) by 404 days.

(21) Appl. No.: 14/453,847

(22) Filed: Aug. 7, 2014

(65) Prior Publication Data
US 2016/0041738 A1 Feb. 11, 2016

(51) Int. Cl.
| | | |
|---|---|---|
| *G06F 17/00* | (2006.01) | |
| *G06F 3/023* | (2006.01) | |
| *G06F 3/01* | (2006.01) | |
| G06F 3/0484 | (2013.01) | |
| G06F 3/0481 | (2013.01) | |

(52) U.S. Cl.
CPC ............ *G06F 3/0237* (2013.01); *G06F 3/018* (2013.01); *G06F 3/04812* (2013.01); *G06F 3/04842* (2013.01)

(58) Field of Classification Search
CPC .......................... G06F 3/04812; G06F 3/04842
See application file for complete search history.

(56) References Cited

U.S. PATENT DOCUMENTS

| | | | |
|---|---|---|---|
| 5,832,528 A * | 11/1998 | Kwatinetz | G06F 3/04842 715/255 |
| 6,944,820 B2 | 9/2005 | Feinberg | |
| 8,111,922 B2 | 2/2012 | Winkler | |
| 2004/0249627 A1* | 12/2004 | Mirkin | G06F 17/24 704/3 |
| 2006/0005151 A1* | 1/2006 | Altman | G06F 3/0481 715/860 |
| 2012/0109634 A1 | 5/2012 | Lanin et al. | |
| 2013/0147707 A1 | 6/2013 | Li | |
| 2015/0106700 A1* | 4/2015 | Allawi | G06F 17/24 715/256 |

* cited by examiner

*Primary Examiner* — Andrew McIntosh
(74) *Attorney, Agent, or Firm* — Finch & Maloney PLLC (57) ABSTRACT

Techniques for bidirectional text selection are disclosed. When a character selection is received, such as a "Shift+ Arrow" input, the unanchored side of a selection area is adjusted by one glyph in the selection direction. The adjusted selection area is then evaluated in terms of logical indices that define the selection. If the range of logical indices is contiguous, such as the range {3, 4, 5}, then the adjusted selection area is accepted, although further adjustments are optionally made for glyphs that map to multiple characters. However, if the range of logical indices is noncontiguous, such as {3, 4, 6}, then the selection area is further adjusted until a contiguous selection of logical indices is achieved. For instance, a character corresponding to logical index {5} is added to a selection of characters corresponding to logical indices {3, 4, 6} to produce a selection that is logically and visually contiguous.

20 Claims, 7 Drawing Sheets

FIG. 2

| Visual Index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|
| Individual Characters | ظ | ا | ط | ن | ي | ر | ب | | W | o | r | d | p | a | d | | N | o | t | e | p | a | d | | ي | ج | م | ا | ن | ر | ب |
| RTL Logical Index | | | | | | | | | 9 | 10 | 11 | 12 | 13 | 14 | 15 | | 7 | 6 | 5 | 4 | 3 | 2 | 1 | 0 |
| LTR Logical Index | 32 | 31 | 30 | 29 | 28 | 27 | 26 | 25 | 17 | 18 | 19 | 20 | 21 | 22 | 23 | 24 | 16 | | 8 | 9 | 10 | 11 | 12 | 13 | 14 | 15 | | 7 | 6 | 5 | 4 | 3 | 2 | 1 | 0 |

| Composite Text | برنامجي | Notepad | و | Wordpad | و | نظام |
|---|---|---|---|---|---|---|

Leftward Selection Illustrated in Figure 4A

| Keystroke | Initially Selected Visual Indices Based on Initial Adjustment (Fig. 2 at 1200) | Initially Selected Logical Indices Based on Initial Adjustment (Fig. 2 at 1200) | Initial Logical Range Contiguous? (Fig. 2 at 1400) | Final Selected Logical Indices as Modified to Preserve Contiguity (Fig. 2 at 1500) | Final Selected Visual Indices (Fig. 2 at 1500) |
|---|---|---|---|---|---|
| 0 | ∅ | ∅ | n/a | ∅ | ∅ |
| 1 | {28, 29} | {4, 5} | yes | {4, 5} | {28, 29} |
| 2 | {27–29} | {4–6} | yes | {4–6} | {27–29} |
| 3 | {26–29} | {4–7} | yes | {4–7} | {26–29} |
| 4 | {25–29} | {4–8} | yes | {4–8} | {25–29} |
| 5 | {24–29} | {4–8} and {14, 15} | no | {4–15} | {18–29} |
| 6 | {17–29} | {4–16} | yes | {4–16} | {17–29} |
| 7 | {16–29} | {4–17} | yes | {4–17} | {16–29} |
| 8 | {15–29} | {4–17} and {23, 24} | no | {4–24} | {9–29} |

Rightward Selection Illustrated in Figure 5A

| Keystroke | Initially Selected Visual Indices Based on Initial Adjustment (Fig. 2 at 1200) | Initially Selected Logical Indices Based on Initial Adjustment (Fig. 2 at 1200) | Initial Logical Range Contiguous? (Fig. 2 at 1400) | Final Selected Logical Indices as Modified to Preserve Contiguity (Fig. 2 at 1500) | Final Selected Visual Indices (Fig. 2 at 1500) |
|---|---|---|---|---|---|
| 0 | ∅ | ∅ | n/a | ∅ | ∅ |
| 1 | {13, 14} | {21, 22} | yes | {21, 22} | {13, 14} |
| 2 | {13–15} | {21–23} | yes | {21–23} | {13–15} |
| 3 | {13–16} | {21–24} | yes | {21–24} | {13–16} |
| 4 | {13–17} | {16, 17} and {21–24} | no | {16–24} | {9–17} |
| 5 | {9–18} | {15–24} | yes | {15–24} | {9–18} |
| 6 | {9–19} | {8, 9} and {15–24} | no | {8–24} | {9–25} |
| 7 | {9–26} | {7–24} | yes | {7–24} | {9–26} |
| 8 | {9–27} | {6–24} | yes | {6–24} | {9–27} |

BIDIRECTIONAL TEXT SELECTION

FIELD OF THE DISCLOSURE

This disclosure relates generally to a user interface for a computer system, and more specifically to methods for bidirectional text selection in a computer user interface.

BACKGROUND

A variety of writing systems are used to represent the thousands of written languages in existence today. Some languages, such as English and Korean, use a left-to-right (LTR) writing system, while other languages, such as Persian, use a right-to-left (RTL) writing system. Still other languages are "bidirectional" in that they use a combination of LTR and RTL writing systems; examples include modern Hebrew and Arabic, in which RTL words are often mixed with LTR numbers. Bidirectional text may also arise where LTR and RTL writing systems are used in combination. For example, this sentence, which includes LTR English text and the RTL Arabic word "برنامجي", contains bidirectional text. While early computer systems supported only a single writing system and alphabet, such as a LTR writing system based on the Latin alphabet, the Unicode standard now provides detailed rules that govern how bidirectional text is encoded and displayed. In particular, according to the Unicode standard, characters that have an inherent writing order, such as the character "a", are called "strong" characters. Characters that do not have an inherent writing order, such as most punctuation characters, are called "weak" characters. Software algorithms are used to determine whether weak characters should be associated with a LTR or a RTL writing system, although ambiguities may still result in unintentional display errors. Such errors can be corrected or prevented with nonprinting "marks" that make an enclosed weak character inherit a particular writing direction.

DETAILED DESCRIPTION

When a user enters unidirectional text via a computer interface, the characters comprising the text are rendered in the same sequence in which they are entered. That is, an initial character appears immediately adjacent to a second character, which in turn appears immediately adjacent to a third character, and so on. As a result, subsequent selection of unidirectional text via a highlighting operation results in a straightforward contiguous selection of characters. In contrast, when a user enters bidirectional text, a discrepancy may arise between the sequence in which the characters are entered and rendered. For example, when the bidirectional phrase برنامجي Notepad و Wordpad في نظام is entered, the characters "و" and "W" are entered sequentially, despite the fact that these characters are separated from each other when rendered. This discrepancy between the sequence in which characters are entered (also referred to as the "logical" sequence) and the sequence in which characters are rendered (also referred to as the "visual" sequence) makes selection of bidirectional text complex and often counterintuitive. For example, conventional methods for selection of bidirectional text can result in cursor movements that are opposite to a user's directional arrow inputs. In addition, bidirectional text selection that is logically contiguous is not necessarily visually contiguous, meaning that a text selection based on a contiguous logical sequence may result in two or more noncontiguous visual segments. Such segmentation can be avoided by selecting text on a page-by-page or line-by-line basis, neither of which are practically feasible in many applications. These complexities and limitations represent a substantial impediment to users who work with bidirectional text.

Thus, and in accordance with certain of the embodiments disclosed herein, techniques are disclosed that facilitate the straightforward and intuitive selection of a contiguous segment of bidirectional text. When a character selection is received, such as in the form of a Shift+Arrow keyboard input, the unanchored side of a selection area is adjusted by one glyph in the selection direction. Once this adjustment has been made, the adjusted selection area is evaluated in terms of a range of logical indices that comprise the selection. If the range of logical indices is contiguous, such as in the case of the range {3, 4, 5}, then the adjusted selection area is considered acceptable, although further adjustments are optionally made for glyphs that map to multiple characters. However, if the range of logical indices is noncontiguous, such as in the case of the range {3, 4, 6}, then the selection area is further adjusted in a stepwise fashion until a contiguous selection of logical indices is achieved. For instance, a character corresponding to logical index {5} can be added to a selection of characters corresponding to logical indices {3, 4, 6} to produce a selection that is both logically and visually contiguous. Numerous configurations and variations of this example implementation will be apparent in light of this disclosure.

A number of advantages are associated with certain of the disclosed embodiments. For example, such embodiments allow bidirectional text to be selected using arrow key inputs that correspond to the direction of the text selection on a display screen, thus providing a more simple and intuitive selection system. Bidirectional text can also be selected in a way that avoids creating a noncontiguous visual selection, thus promoting clarity and uniformity. In particular, such embodiments enable a user to seamlessly select bidirectional text while maintaining the visual aesthetic of a document. By simplifying the selection process, frequently used text editing operations, such as copying, pasting, inserting, and deleting text, can be performed more efficiently and accurately. For example, this avoids the tedious individual selection and adjustment of weak characters, such as punctuation marks and spaces. These and other advantages will be appreciated in view of this disclosure.

As used herein the term "glyph" refers, in addition to its ordinary meaning, to a typographical element that can be understood as comprising one or more characters. In many cases, a one-to-one correspondence exists between glyphs and characters, such as in the case of the character "a" being represented by the glyph "a". However in some cases a combination of multiple characters can be represented by a single glyph. For instance, the characters "o" and "e" can be combined and represented by the single glyph "œ". Similarly, the characters "f" and "l" can be combined and represented by glyphs such as "ffl" or "fl". As yet another example, the characters "ڧ" and "ي" can be combined and represented by the single glyph "ڧي". Thus it will be appreciated that selection of a single glyph may, in some instances, constitute selection of multiple characters. The term "ligature" refers to the action of binding two characters together to form a glyph, and therefore the terms "glyph" and "ligature" are often used interchangeably when referring to glyphs that correspond to multiple characters. Although ligatures are used in a wide range of languages, they are particularly common in Arabic.

As used herein the term "index" refers, in addition to its ordinary meaning, to a number associated with a character. When multiple indices are grouped together, they can be understood as forming an ordered numerical sequence that can be used to characterize a textual unit such as a word or phrase. A "visual" index refers to the numerical sequence in which characters are rendered, for example on a printed page or an electronic display. Thus a sequence of characters having a contiguous range of visual indices will appear together as a single unit when rendered. A "logical" index refers to the numerical sequence in which characters are entered and/or read. Thus, while the visual and logical indices can be understood as directly corresponding to each other for unidirectional text, this will not necessarily be the case for bidirectional text. In addition, the points in bidirectional text where LTR and RTL characters meet can be understood as corresponding to two different logical indices for the two different text directions. Thus it will be appreciated that, in the context of bidirectional text, a given point in the text may be understood as corresponding to both a LTR logical index and a distinct RTL logical index.

As used herein the term "selection area" refers, in addition to its ordinary meaning, to a group of characters which have been selected through the action of a user, an automated software-based selection technique, or any other appropriate character selection mechanism. A selection area can be indicated through the use of a distinctive display feature, such as a uniquely colored background (for example, black text on a cyan background) or inversely-colored text (for example, white text on a black background). A selection area can be defined using a wide variety of techniques, including both pointer-based techniques (such as using a mouse or gesturing on a touch sensitive surface) and keyboard-based techniques (through the use of shortcut keys or navigation keys). For example, in one frequently used computing environment navigation keys are used in combination with the "Shift" key to define a selection area. Conventionally, a selection area is bounded by (a) a fixed or "anchored" side that corresponds to the location where the selection was initiated and (b) a floating or "unanchored" side that is movable. However it will be appreciated that in certain of the embodiments disclosed herein both the anchored and unanchored sides of a selection area are movable.

System Architecture

Figure 1:
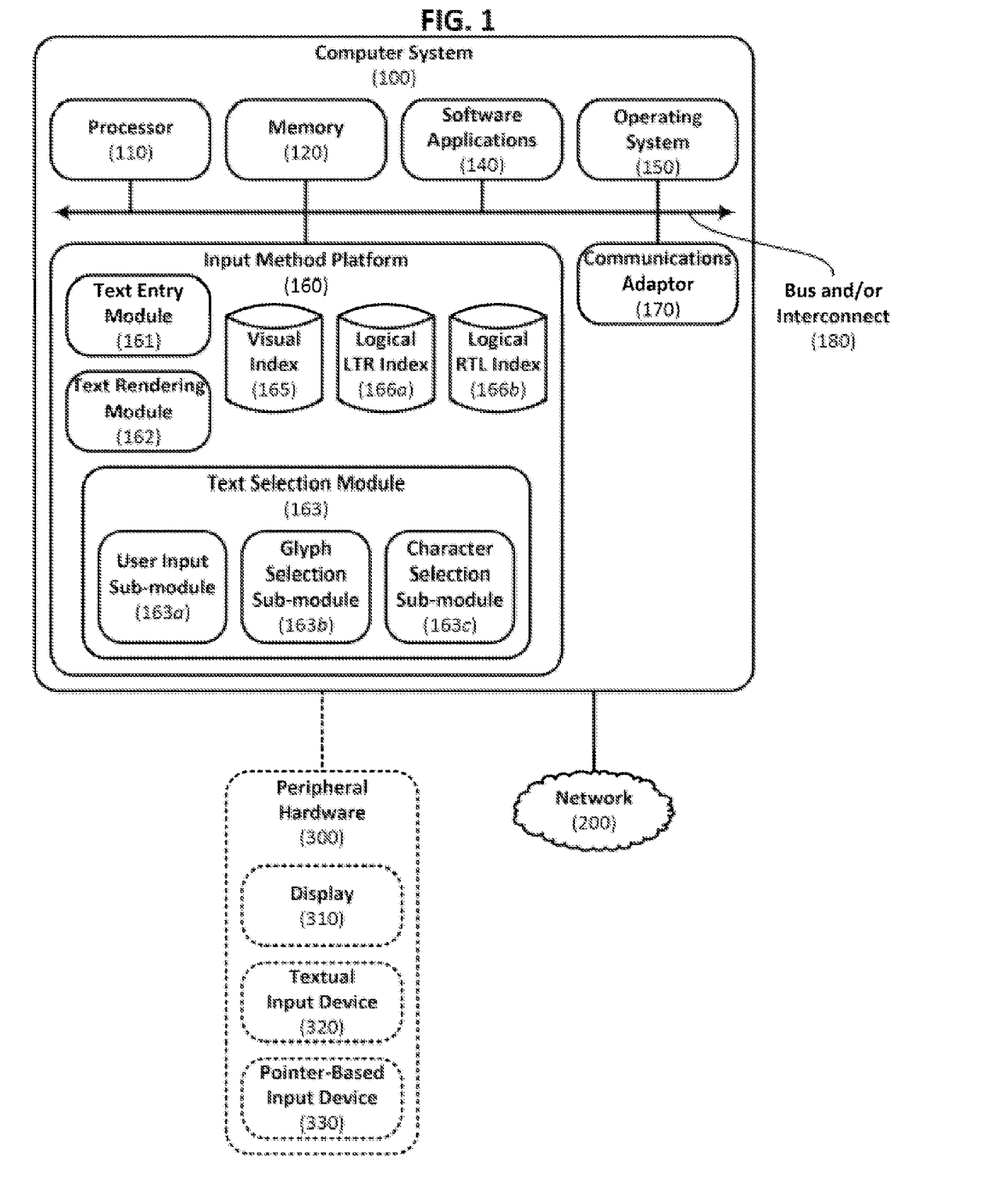
FIG. 1 is a block diagram schematically illustrating selected components of a computer system that can be used to implement certain of the bidirectional text selection techniques disclosed herein.

FIG. 1 is a block diagram schematically illustrating selected components of a computer system 100 that can be used to implement certain of the bidirectional text selection techniques disclosed herein. Computer system 100 may comprise, for example, one or more devices selected from a desktop computer, a laptop computer, a workstation, a tablet computer, a smartphone, a handheld computer, a set-top box, or another suitable computing device. A combination of different devices may be used in certain embodiments. In the illustrated example embodiment, computer system 100 includes, among other things, a processor 110, a memory 120, one or more software applications 140, an operating system 150, an input method platform 160, and a communications adaptor 170. A bus and/or interconnect 180 is also provided to allow for intra-device communications using, for example, communications adaptor 170. Computer system 100 is optionally coupled to a network 200 to allow for communications with other computing devices and resources, such as a font resource library or a cloud-based storage repository. Other componentry and functionality not reflected in the schematic block diagram of FIG. 1 will be readily apparent in light of this disclosure, and it will be appreciated that the claimed invention is not intended to be limited to any specific hardware configuration. Thus other configurations and subcomponents can be used in other embodiments.

Processor 110 can be implemented using any suitable processor, and may include one or more coprocessors or controllers, such as a graphics processing unit or an audio processor, to assist in control and processing applications associated with computer system 100. Likewise, memory 120 can be implemented using any suitable type of digital storage, such as one or more of a disk drive, a universal serial bus (USB) drive, flash memory, random access memory, or any suitable combination of the foregoing. Memory 120 can be used, for example, to store character maps and font definitions which are installed on operating system 150. Memory 120 can also be used to store logical and visual indices associated with received text input.

Operating system 150 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Resources such as character maps and font definitions can be installed on operating system 150 and can therefore be made available to other software applications 140 running on computer system 100. In certain embodiments the bidirectional text selection methods disclosed herein can be used in conjunction with text entry provided via operating system 150, such as in the case of text entry associated with configuration settings and text entry associated with defining resource names.

Software applications 140 may include one or more of a wide range of computer programs that are capable of receiving textual input, such as word processing applications, text editing applications, spreadsheet applications, database management applications, and image editing software applications. Software applications 140 can be configured to leverage resources provided by operating system 150, such as character maps and font definitions. Furthermore, it will be appreciated that many software applications include textual input capabilities, even if the primary purpose of the software application does not relate to text entry. For example, a software application configured to manage audio tracks stored on a portable music player may nevertheless include textual input capabilities that support functionality such as the ability to rename audio tracks or customize other settings that control how the application operates.

Communications adaptor 170 can be implemented using any appropriate network chip or chipset which allows for wired or wireless connection to network 200 and/or other computing devices and resources. Network 200 may be a local area network (such as a home-based or office network), a wide area network (such as the Internet), or a combination of such networks, whether public, private, or both. In some cases access to resources on a given network or computing system may require credentials such as usernames, passwords, or any other suitable security mechanism. While computer system 100 is illustrated as being connected to network 200, in alternative embodiments the functionality described herein can also be implemented on a standalone computer system that is not connected to any network or other remote computing resources.

In certain embodiments input method platform 160 is configured to manage the receipt, display, and selection of text entered using one or more peripheral hardware components 300. Examples of peripheral hardware components 300 include a display 310, a textual input device 320 (such as a keyboard), and/or a pointer-based input device 330 (such as a mouse). One or more additional or alternative input/output devices, such as a touchscreen display, a speaker, or a microphone, can be used in other embodiments. For example, in an alternative embodiment software applications 140 include voice recognition software and peripheral hardware 300 includes a microphone, thereby enabling computer system 100 to receive textual input by analyzing audio recorded using the microphone. In another alternative embodiment, a touch sensitive display is configured to render a virtual keyboard via which a user can provide textual input in similar fashion to use of a conventional tactile keyboard. A touch sensitive display can also be used to provide a text selection by any of a variety of suitable highlighting techniques that are responsive to one or more gestures detected by the display. Such gestures can be considered to correspond to the keyboard-based selection inputs disclosed herein, and therefore in certain embodiments the bidirectional text selection techniques disclosed herein are responsive to text selection input received via a touch sensitive display. Text selection inputs can also be received using pointer-based input device 330, such as by clicking and dragging a mouse pointer over targeted text. One or more of the peripheral hardware components are integrated into the computer system itself, such as in the case of a laptop or tablet computer.

Referring still to the example embodiment illustrated in FIG. 1, input method platform 160 comprises a text entry module 161, a text rendering module 162, a text selection module 163, and one or more character indices, such as a visual index 165, a logical LTR index 166a, and a logical RTL index 166b. In such embodiments text entry module 161 can be configured to receive text entry provided via, for example, a conventional tactile keyboard, a virtual keyboard rendered on a touch sensitive display, a voice recognition software application, or any other suitable system for textual input. Upon receiving the textual input, text entry module 161 indexes the characters comprising the textual input in logical LTR index 166a and/or logical RTL index 166b. The characters can be indexed by assigning a numerical value to each character in the order received. For example, where text entry module 161 receives LTR text entry comprising the word "Hello", the character "H" will be assigned a logical LTR index of 1, the character "e" will be assigned a logical LTR index of 2, and so forth. As another example, where text entry module 161 receives RTL text entry comprising the word "مرد ب", the character "م" will be assigned a logical RTL index of 1, the character "ر" will be assigned a logical RTL index of 2, and so forth. Where bidirectional text entry is received, different logical indices may be assigned to characters located at the points where LTR and RTL text meet. Thus in certain implementations text entry module 161 can be configured to generate separate logical indices for the received LTR and RTL text. Regardless of whether unidirectional or bidirectional text is received, the logical index or indices that text entry module 161 generates correspond to the sequence in which characters are entered and/or read. Thus a logical index can be understood as comprising a data structure that correlates a particular character with a particular index value.

Text rendering module 162 can be configured to render the received textual input using a rendering device such as display 310. As part of this process, text rendering module 162 can also be configured to index the characters comprising the textual input in visual index 165. The rendered characters can be indexed by assigning a numerical value to each character in the sequential order they appear on the rendering device. The visual index may increase from LTR or RTL, but its sequence will be unaffected by changes in whether LTR or RTL text is being rendered. Thus in the case of unidirectional text, the logical index will directly correspond to the visual index. However, in the case of bidirectional text, the logical and visual indices may diverge at certain points. Like the logical LTR and RTL indices 166a, 166b, visual index 165 can also be understood as comprising a data structure that correlates a particular character with a particular index value. In some applications, text rendering module 162 also be configured to render a text selection defined by text selection module 163, wherein such selection is indicated by highlighting selected text using a uniquely colored background or inversely-colored text.

As illustrated in FIG. 1, in certain embodiments text selection module 163 comprises user input sub-module 163a, glyph selection sub-module 163b, and character selection sub-module 163c. User input sub-module 163a is configured to receive user input that defines a textual selection. In one embodiment, the textual selection can be defined based on the combined use of a shift key and navigation keys, such as in the case of a "Shift+Left Arrow" or "Shift+Right Arrow" combination. Other navigation keys or key combinations, such as Home, End, Page Up, Page Down, Control+Arrow, Control+Home, Control+End, and Control+Page Navigation can be used as well. It will be appreciated that the shift key can be held down while multiple such navigation inputs are provided, thereby further defining a textual selection. While the foregoing examples are described in the context of a conventional tactile keyboard, it will be appreciated that such inputs may also be provided via a virtual keyboard displayed on a touch sensitive display. In still other implementations a touch sensitive display can also be used to define a textual selection by any suitable highlighting technique that is responsive to one or more gestures detected by the display. In such case, the highlighting gestures can be considered to correspond to the aforementioned keyboard-based selection inputs.

In certain embodiments user input sub-module 163a can be configured to work in conjunction with glyph selection sub-module 163b and character selection sub-module 163c to provide a desired selection resolution. For example, glyph selection sub-module 163b can be configured to define a selection area based on input processed by user input sub-module 163a. The selection can initially be processed on a glyph-by-glyph basis, for example such that the glyph "ffl" is selected as a single unit. However, because a user may which to more specifically define the textual selection on an individual character basis, character selection sub-module 163c can be configured to determine where a textual selection is bounded by a glyph that maps to more than one character, in which case the selection can be reduced to include only a portion of the characters comprising a multi-character glyph.

Figure 2:
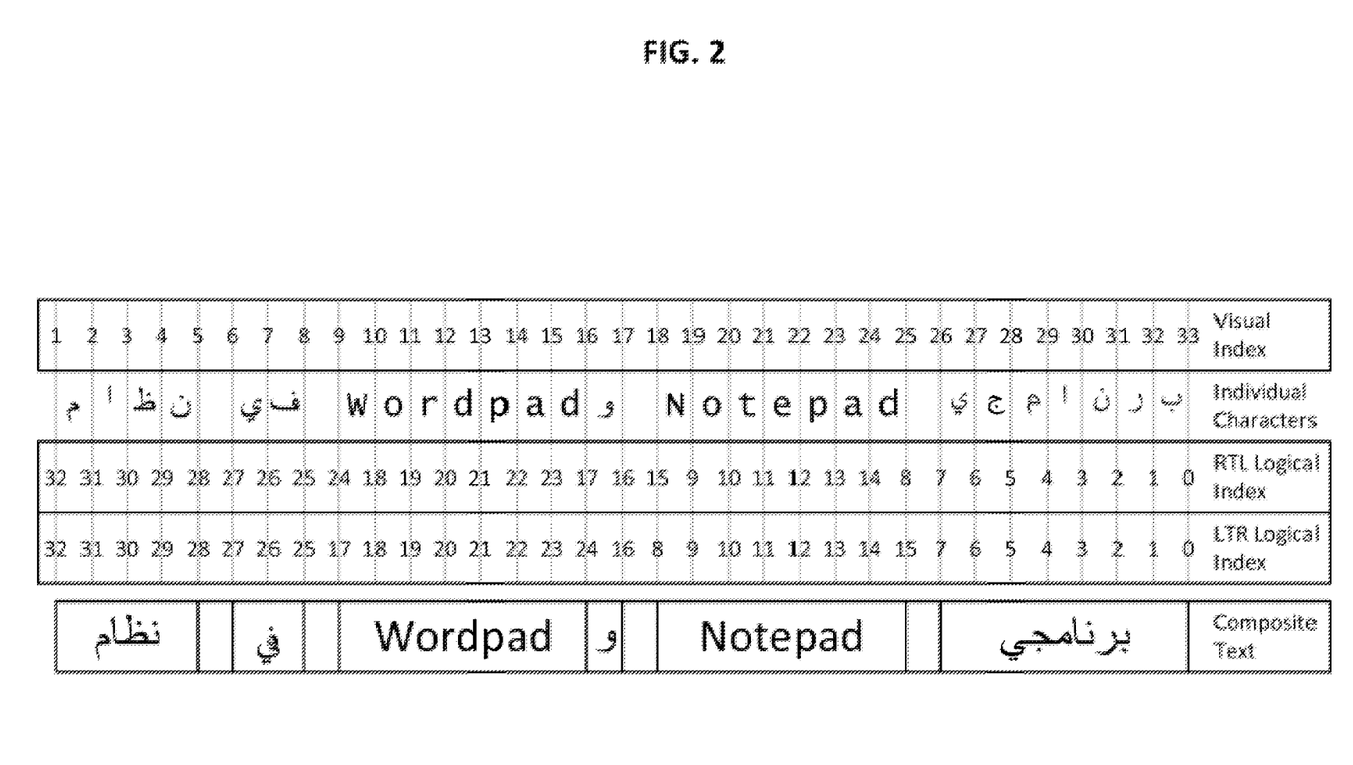
FIG. 2 is a diagram schematically illustrating the correlation of a visual index, a logical index based on RTL character input, and a logical index based on LTR character input for a phrase comprising bidirectional text.

FIG. 2 is a diagram schematically illustrating the correlation of a visual index, a logical index based on RTL character input, and a logical index based on LTR character input for a phrase comprising bidirectional text. Each character can be understood as corresponding to a visual index that counts characters as they are visually arranged from LTR. The visual indices of two characters that appear adjacent to each other are separated by one unit, even though the adjacent characters may not have been entered sequentially. For example, referring to the phrase illustrated in FIG. 2, the characters "d" and "و" appear adjacent to each other, and therefore have visual indices which are separated by one unit (15 and 16), despite the fact that these two characters were not typed sequentially. In contrast to the visual indices, the logical indices illustrated in FIG. 2 correlate to the sequence in which the characters were entered. Thus, for example, the characters "W" and "و" are visually separated from each other, but have logical indices which are separated by one unit (RTL logical index 16 for "و" followed by LTR logical index 17 for "W"). Thus it will be appreciated that bidirectional text results in a divergence between logical and visual indices that does not occur in the case of unidirectional text.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the bidirectional text selection methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as word processing applications, desktop publishing applications, presentation applications, spreadsheet applications, and web content authoring applications. For example, a word processing application can be configured to select bidirectional text according to the various embodiments disclosed herein. The functionalities disclosed herein can also be incorporated into software applications having a primary purpose other than text entry, such as wireless networking applications, music mixing applications, image editing applications, or even operating system components. Thus even where text entry is provided in conjunction with an ancillary function such as resource naming or configuration settings, the bidirectional text selection methodologies disclosed herein can still be invoked. Thus in some implementations the functionality described herein can be provided on an individual application basis, while in other implementations such functionality can be provided by an operating system to a range of applications that leverage resources provided by the operating system. The computer systems disclosed herein may include a number of different modules, sub-modules, or other components of distinct functionality, and can provide information to, or receive information from, still other components and services. These modules can be used, for example, to communicate with components associated with peripheral hardware 300, networked storage resources, or other external components. Other components and functionality not reflected in the illustrations will be apparent in light of this disclosure, and it will be appreciated that the present disclosure is not intended to be limited to any particular hardware or software configuration. Thus in other embodiments the components illustrated in FIG. 1 may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with software, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present disclosure is not intended to be limited to any particular system architecture.

Methodology

Figure 3:
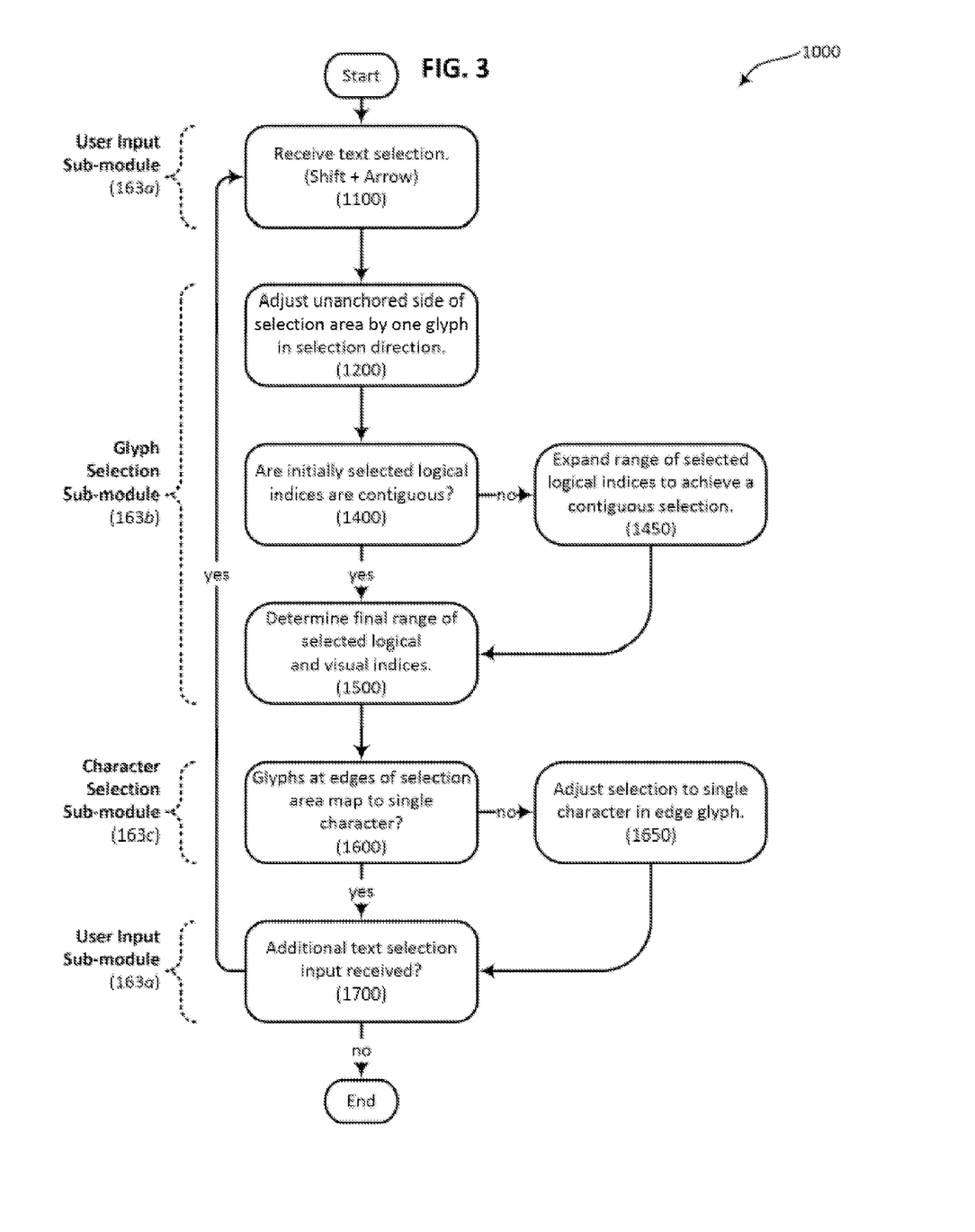
FIG. 3 is flowchart illustrating a method for selecting bidirectional text in accordance with certain of the embodiments disclosed herein.

FIG. 3 is a flowchart illustrating a bidirectional text selection method 1000 in accordance with certain of the embodiments disclosed herein. As can be seen, bidirectional text selection method 1000 includes a number of phases and sub-processes, the sequence of which may vary from one embodiment to another. However, when considered in the aggregate, these phases and sub-processes form a complete bidirectional text selection process that is responsive to user input in accordance with certain of the embodiments disclosed herein. These methodologies can be implemented, for example, using the system architecture illustrated in FIG. 1. However other system architectures can be used in other embodiments, as will be apparent in light of this disclosure. To this end, the correlation of the various functionalities shown in FIG. 3 to the specific components illustrated in FIG. 1 is not intended to imply any structural and/or use limitations. Rather, other embodiments may include varying degrees of integration where multiple functionalities are performed by one system or by separate systems. For instance, in an alternative embodiment a single selection module can be used to perform both glyph and character selection. Thus other embodiments may have fewer or more modules and sub-modules depending on the granularity of implementation. Numerous variations and alternative configurations will be apparent in light of this disclosure.

Still referring to FIG. 3, the example bidirectional text selection method 1000 commences with user input module 163a receiving a text selection. See reference numeral 1100 in FIG. 3. In one implementation, the text selection may comprise holding down the shift key and using an arrow key or other navigation key to define the selection. In response to such a selection, glyph selection sub-module 163b adjusts an unanchored side of a selection area by one glyph in the selection direction as defined by the user input. See reference numeral 1200 in FIG. 3. A selection area can be understood as being bounded by an anchored side that corresponds to the location where the selection was initiated and an unanchored side that is movable based on user input that enlarges or reduces the selection area. Because glyph selection sub-module 163b adjusts the unanchored side of the selection area by one glyph in the selection direction, this adjustment of the selection area can be understood as enlarging or reducing the selection area by one glyph in the visual index. This ensures that the text selection direction corresponds to the navigation input provided by the user, thus resulting in a straightforward and intuitive selection process. In addition, adjusting the unanchored side of the selection area in a stepwise fashion ensures that the selection area remains visually contiguous and does not "break" into visually separated portions.

In an alternative embodiment glyph selection sub-module 163b can be configured to receive a text selection without the benefit of individual character-by-character or glyph-by-glyph selections. For example, a mouse or other pointing device can be used to highlight selected text. In this case the point where the selection is initiated (such as where a mouse click is initiated) is considered to be the anchored side of the selection area, while the point where the selection ends (such as where a mouse click is released) is considered to be the unanchored side of the selection area. Once the initial text selection is defined glyph selection sub-module 163b can be configured to analyze the contiguity of the selection as will be described in turn. Thus individual character or glyph selections may not be used in such alternative embodiments. It will be appreciated, however, that a selection area defined using a pointer-based technique can subsequently be modified using a keyboard-based technique.

Figure 4A:
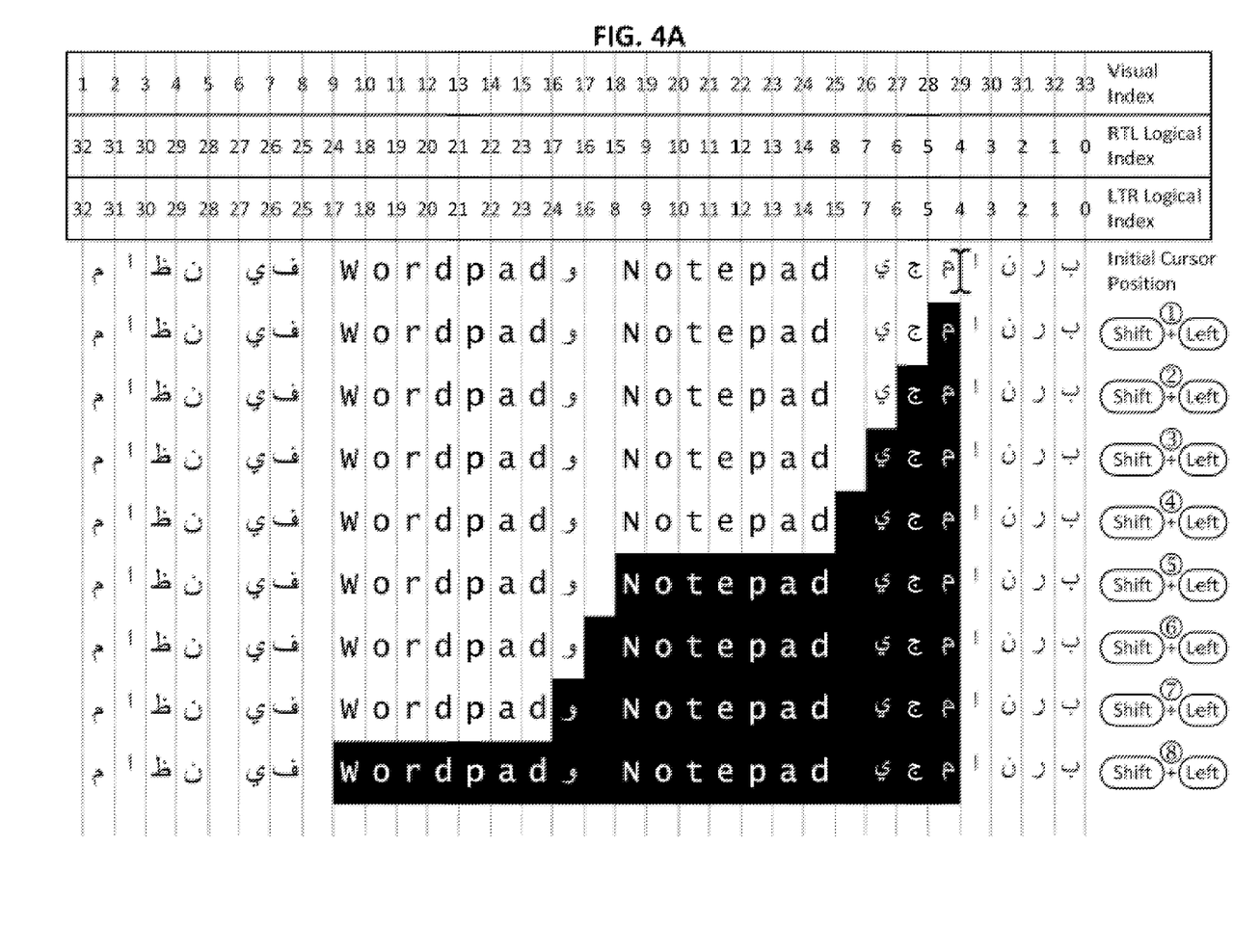
FIG. 4A is a diagram schematically illustrating keystroke-by-keystroke leftward selection of bidirectional text that begins within RTL text.
Figure 5A:
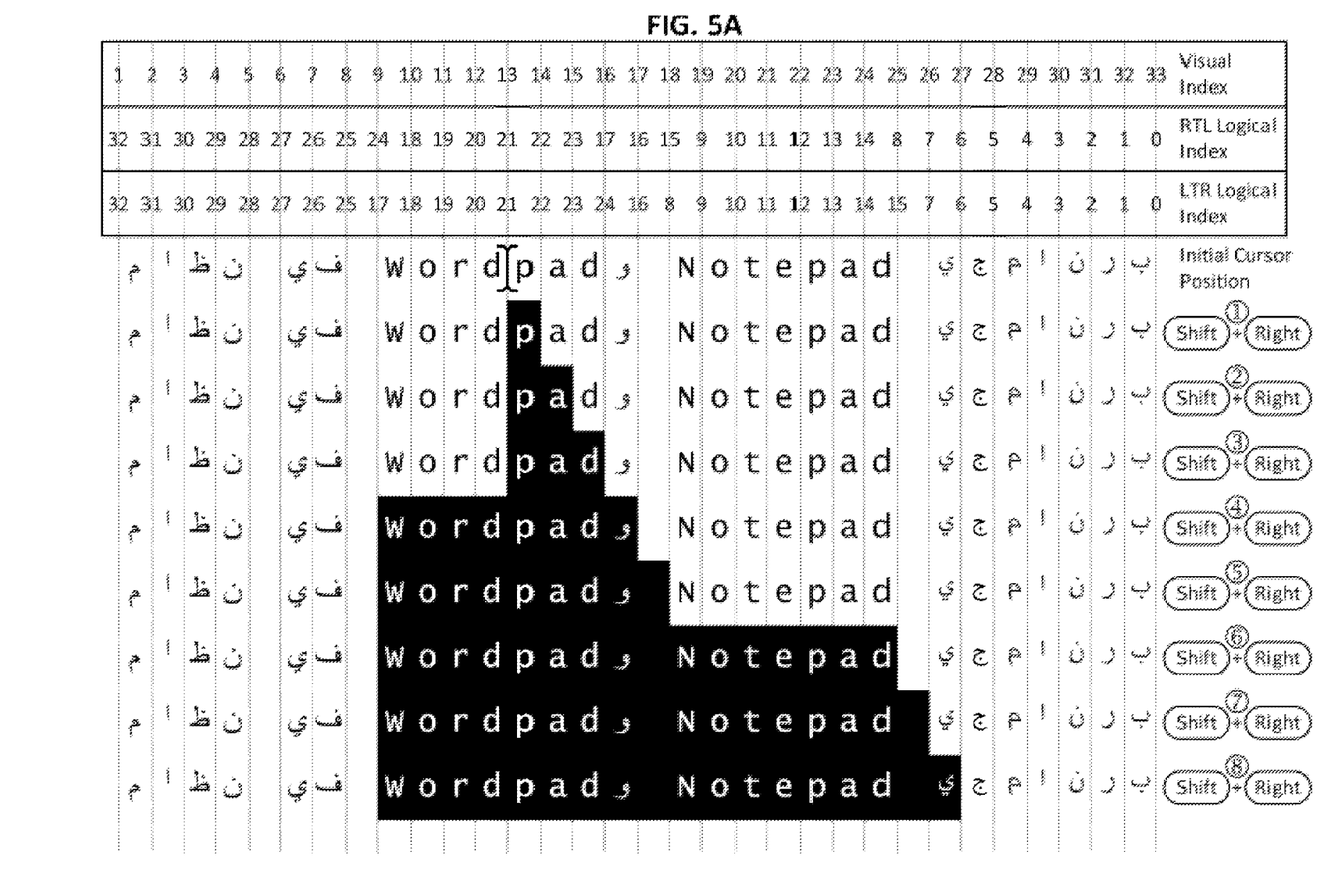
FIG. 5A is a diagram schematically illustrating keystroke-by-keystroke rightward selection of bidirectional text that begins within LTR text.

Examples of this text selection process are illustrated in FIGS. 4A and 5A. In particular, FIG. 4A schematically illustrates keystroke-by-keystroke leftward selection of bidirectional text that begins within RTL text. This may occur, for example, in response to a leftward text navigation input, such as a Shift+Left Arrow keystroke. Similarly, FIG. 5A schematically illustrates keystroke-by-keystroke rightward selection of bidirectional text that begins within LTR text. This may occur, for example, in response to a rightward text navigation input, such as a Shift+Right Arrow keystroke. In FIG. 4A an initial cursor position is between the characters "ي" and "م", such that a first leftward text selection input results in selection of the "م" character. Likewise, in FIG. 5A an initial cursor position is between the characters "d" and "p", such that a first rightward text selection input results in selection of the "p" character. When the first text selection keystroke is received to define a new selection area, both the unanchored and anchored sides of the selection area can be understood as being located at the initial cursor position. After the first selection keystroke is received and the selection area comprises at least one character, the unanchored and anchored sides of the selection area will be separated by at least the one selected character.

Figure 4B:
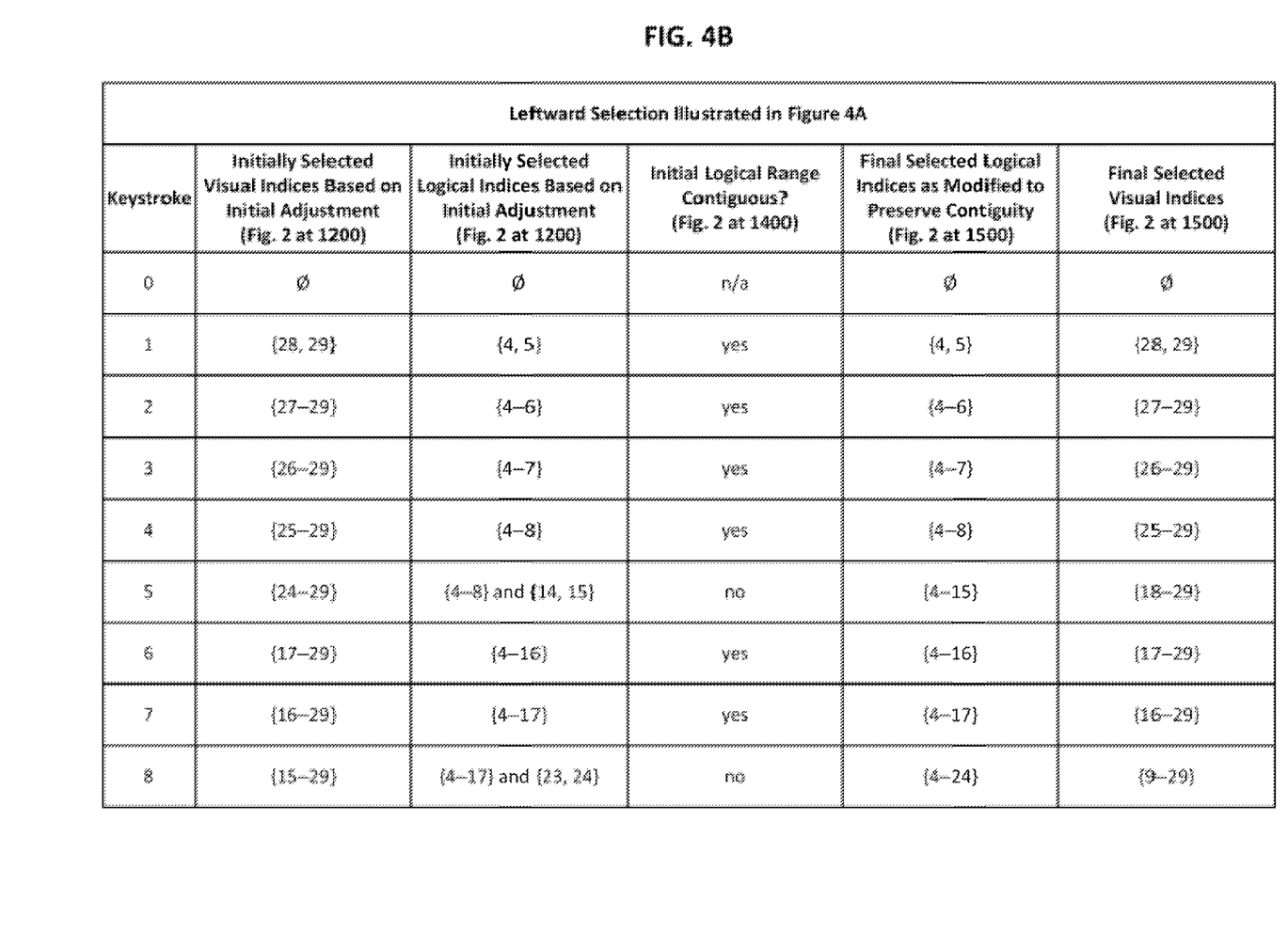
FIG. 4B is a table listing ranges of selected logical indices for each of the successive selections illustrated in FIG. 4A.
Figure 5B:
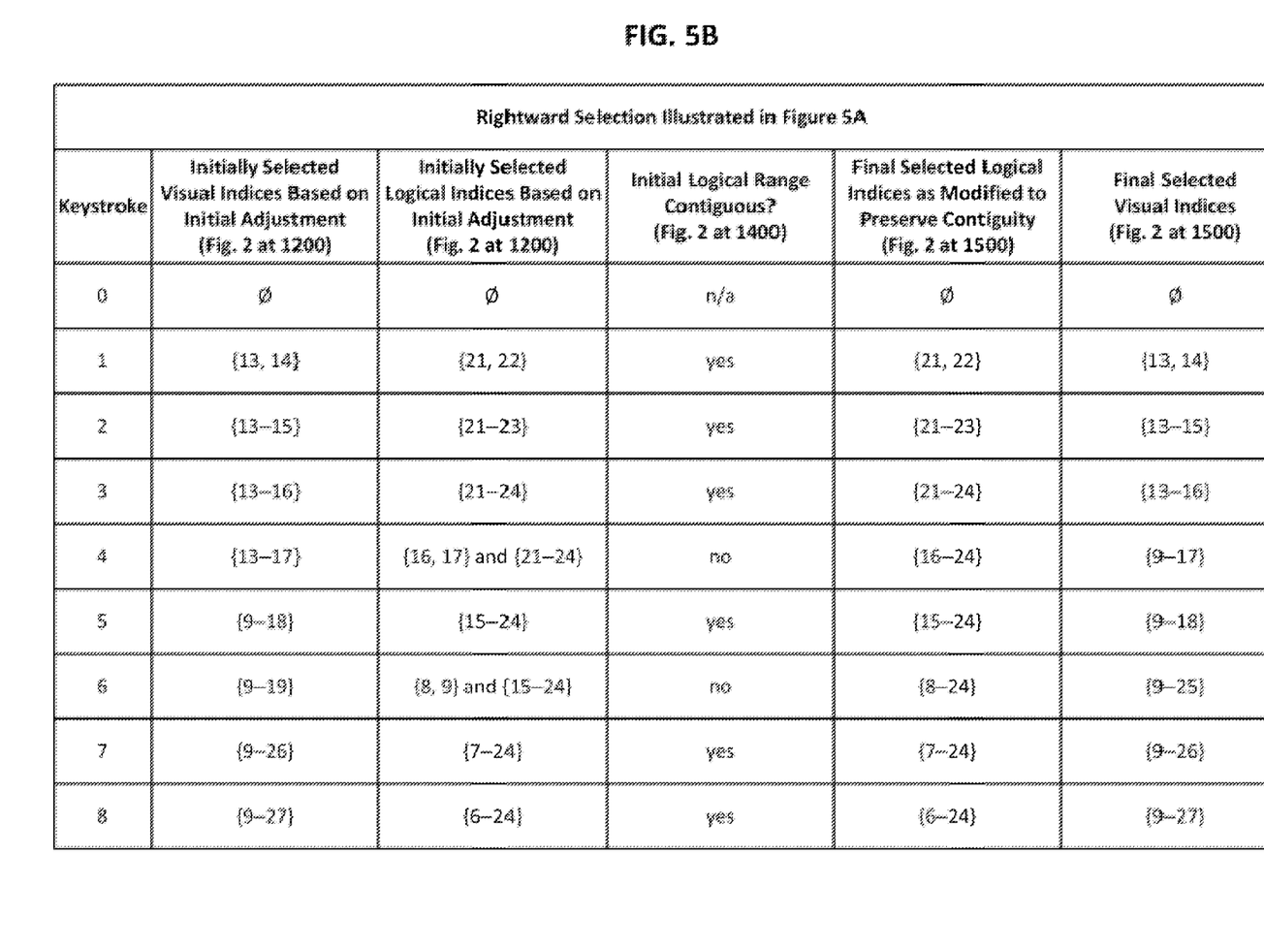
FIG. 5B is a table listing ranges of selected logical indices for each of the successive selections illustrated in FIG. 5A.

Once the unanchored side of the selection area has been appropriately adjusted, glyph selection sub-module 163b can be configured to determine whether the selection area constitutes a contiguous selection of logical indices. See reference numeral 1400 in FIG. 3. This can be accomplished by inspecting the range of selected logical indices based on the initial adjustment of the selection area. For example, the initial Shift+Left selection illustrated in FIG. 4A which results in selection of the "م" character corresponds to a range of logical indices of {4, 5}. Continued leftward selection results in the successive selection of the "ج", "ي", and the space characters, which will correspond to a selected range of logical indices of {4, 5, 6, 7, 8} after four selection keystrokes. The growth of the selected range of logical indices as a result of each of these leftward selection keystrokes is illustrated in FIG. 4B. Likewise, the initial Shift+Right selection illustrated in FIG. 5A which results in selection of the "p" character corresponds to a range of logical indices of {21, 22}. Continued rightward selection results in the successive selection of the "a" and "d" characters, which will correspond to a selected range of logical indices of {21, 22, 23, 24} after three selection keystrokes. The growth of the selected range of logical indices as a result of each of these rightward selection keystrokes is illustrated in FIG. 5B.

In each of the foregoing examples, adjusting the unanchored side of the selection area results in a contiguous selection of logical indices. However, if adjusting the unanchored side of the selection area results in a noncontiguous selection of logical indices, the selection area is expanded to achieve a contiguous selection. See reference numeral 1450 in FIG. 3. For example, the fifth leftward selection illustrated in FIG. 4A results in selection of the "d" character, thereby producing a noncontiguous range of selected logical indices of {4, 5, 6, 7, 8} and {14, 15}. This is also illustrated in FIG. 4B. In particular, because the space character and the "d" character are not typed successively, these characters have logical indices which are noncontiguous. In this case, the noncontiguous range of selected logical indices {4, 5, 6, 7, 8} and {14, 15} is expanded to achieve a contiguous selection of logical indices {4, 5, 6, 7, 8, 9, 10, 11, 12, 13, 14, 15}. As illustrated in FIG. 4A, this expansion results in the concurrent selection of the characters "N", "o", "t", "e", "p", and "a". In combination with the other selected characters, the result is the selection of the text "Notepad مجي", as illustrated in FIG. 4A. The fifth Shift+Left selection therefore results in selection of multiple characters in the leftward direction, but still maintains directionality and contiguity of the selection area.

Referring still to FIGS. 4A and 4B, the sixth and seventh Shift+Left text selections result in addition of logical indices 16 and 17 to the selection area, respectively, thereby maintaining contiguity of the logical selection. However, the eighth Shift+Left text selection of the character "d"—which corresponds to logical index 24—once again results in a noncontiguous range of logical indices being selected. As in the previous example, this noncontiguous range of selected logical indices can be expanded to achieve contiguity. The result is that the eighth Shift+Left text selection results in selection of the entire word "Wordpad", as illustrated in FIG. 4A. Subsequent leftward text selection would proceed on a character-by-character basis until LTR text is again encountered, in which case any non-contiguities would again be eliminated by expanding the range of selected logical indices to include the largest range.

To provide another example, the fourth rightward selection illustrated in FIG. 5A results in selection of the "j" character, thereby producing a noncontiguous range of selected logical indices of {16, 17} and {21, 22, 23, 24}. This is also illustrated in FIG. 5B. In particular, because the "d" character and the "و" character are not typed successively, these characters have logical indices which are noncontiguous. In this case, the noncontiguous range of selected logical indices {16, 17} and {21, 22, 23, 24} is expanded to achieve a contiguous selection of logical indices {16, 17, 18, 19, 20, 21, 22, 23, 24}. As illustrated in FIG. 5A, this expansion results in the concurrent selection of the characters "W", "o", "r", and "d". In combination with the other selected characters, the result is the selection of the text "Wordpad و", as illustrated in FIG. 5A. The fourth Shift+Right selection therefore results in selection of one character in the rightward direction ("و") as well as four characters in the leftward direction ("Word"). In this case the anchored side of the selection area moves from between the "d" and "p" characters to the left of the "W" character. Subsequent rightward selection will expand the unanchored side of the selection area rightward without further movement of the anchored side of the selection area. Thus both directionality and contiguity of the selection area are once again maintained.

Referring still to FIGS. 5A and 5B, the fifth Shift+Right text selection results in addition of logical index 15 to the selection area, thereby maintaining contiguity of the logical selection. However, the sixth Shift+Right text selection of the character "N"—which corresponds to logical index 9—once again results in a noncontiguous range of logical indices being selected. As in the previous example, this noncontiguous range of selected logical indices can be expanded to achieve contiguity. The result is that the sixth Shift+Right text selection results in selection of the entire word "Notepad", as illustrated in FIG. 5A. Subsequent rightward text selection would proceed on a character-by-character basis until LTR text is again encountered, in which case any non-contiguities would again be eliminated by expanding the range of selected logical indices to include the largest range.

Referring again to FIG. 3, once a contiguous selection of logical indices is achieved, glyph selection sub-module 163b can be configured to determine a final range of selected logical and visual indices. See reference numeral 1500 in FIG. 3. These final ranges are illustrated in the two columns on the right side of the tables provided in FIGS. 4B and 5B. Character selection sub-module 163c can then be configured to determine whether the glyphs located at the edges of the selection area map to a single character. See reference numeral 1600 in FIG. 3. If a glyph located at the edge of the selection area does not map to a single character, the selection area can be adjusted to encompass only an incremental character in the edge glyph. See reference numeral 1650 in FIG. 3. For example, if the leftward text selection illustrated in FIG. 4A continues, the glyph "في" will be encountered. This glyph is a ligature of the characters "ف" and ي. Thus, after the combined glyph "في" is initially selected, character selection sub-module 163c is configured to adjust the unanchored side of the selection area such that it includes only the character "ف" instead of the entire glyph.

Once the selection area has been adjusted based on any multi-character glyphs existing at the edges, user input sub-module 163a can determine whether additional text selection input is received. See reference numeral 1700 in FIG. 1. The foregoing process can be repeated as long as text selection inputs continue to be received. Where multiple text selection inputs are received, it will be appreciated that such inputs need not always proceed in the same direction. Thus, for example, a leftward text selection such as that illustrated in FIG. 4A can be followed by rightward selection inputs, such as a Shift+Right Arrow input, that would act to reduce the selection area in a stepwise fashion that is opposite to that shown in FIG. 4A. More specifically, while FIG. 4A illustrates that the eighth Shift+Left Arrow input results in selection of the entire word "Wordpad", a hypothetical ninth Shift+Right Arrow input would result in deselection of the entire word "Wordpad". Subsequent Shift+Right Arrow inputs would result in a rightward deselection of text in a stepwise matter corresponding to the initial leftward selection of text.

CONCLUSION

The bidirectional text selection methods disclosed herein provide several advantages with respect to existing methods. For example, the methods disclosed herein maintain consistency between the visual direction of text selection or deselection with the keyboard inputs used to define such selection. More specifically, left- or right-arrow keyboard inputs will correspond to a leftward or rightward movement of the unanchored edge of a selection area, respectively. Even where the anchored edge of a selection area is repositioned in the opposite direction of text selection, such as in the fourth Shift+Right Arrow keystroke illustrated in FIG. 5A, such repositioning is accompanied by an adjustment of the selection area in the same direction of the keyboard input. Maintaining consistency between visual and keyboard selection provides a more straightforward and intuitive selection methodology as compared to existing systems where, for example, rightward keyboard selections correspond to logically forward text selection, regardless of whether LTR or RTL text is being selected. In addition, the methods disclosed herein also avoid preventing visually discontinuous selection regions from being selected. In particular, existing systems which consider only the logical index of the selected characters ignore the fact that the presence of bidirectional text can cause logically consecutive characters to be visually separated. The techniques disclosed herein consider both visual and logical indices when defining a selection area, thereby promoting clarity and uniformity in conjunction with text selection operations.

Numerous variations and configurations will be apparent in light of this disclosure. For instance one example embodiment provides a method for bidirectional text selection that comprises receiving a text selection input that modifies a text selection area and defines a text selection direction. The text selection area comprises a plurality of characters positioned between an unanchored side and an anchored side of the text selection area. The method further comprises adjusting the unanchored side of the text selection area in the text selection direction. Adjusting produces an initial modified selection area. The method further comprises evaluating a list of logical indices corresponding to the initial modified selection area. Where the list of logical indices is noncontiguous, the method further comprises adding logical indices to produce a modified list of logical indices that are contiguous. The method further comprises adjusting at least one of the unanchored and anchored sides of the text selection area based on the logical indices added to produce the modified list. In some cases the text selection area comprises unidirectional text and the initial modified selection area comprises bidirectional text. In some cases both the text selection area and the initial modified selection area comprise bidirectional text. In some cases the text selection input comprises a Shift+Arrow key combination typed on a keyboard. In some cases the method further comprises further comprising rendering a final modified selection area that corresponds to the modified list of logical indices that are contiguous. In some cases the text selection direction is rightward and the anchored side of the text selection area is adjusted leftward based on the logical indices added to produce the modified list. In some cases the text selection direction is leftward and the anchored side of the text selection area is adjusted rightward based on the logical indices added to produce the modified list. In some cases the method further comprises (a) evaluating an edge of the text selection area to determine if a glyph positioned at the edge of the text selection area maps to a plurality of characters; and (b) modifying the text selection area to include less than all of the characters comprising the glyph positioned at the edge of the text selection area where the glyph maps to a plurality of characters. In some cases the text selection input includes a first input that expands the text selection area and a second input that reduces the text selection area.

Another example embodiment of the present invention provides a system for bidirectional text selection that comprises a text rendering module configured to render a plurality of characters, each of which is associated with a logical index. The system further comprises a user input module configured to receive a text selection input that defines an initial selection area. The initial selection area includes an initial subset of the plurality of characters that corresponds to a noncontiguous set of logical indices. The system further comprises a glyph selection module configured to add at least one character to the initial selection area to produce a modified selection area. The modified selection area includes a modified subset of the plurality of characters that corresponds to a contiguous set of logical indices. The text rendering module is further configured to render the modified selection area in conjunction with the plurality of characters. In some cases the system further comprises a character selection sub-module configured to adjust the modified selection area by (a) evaluating an edge of the modified selection area to determine if a glyph positioned at the edge maps to a plurality of characters; and (b) adjust the modified selection area to include less than all of the characters comprising the glyph. In some cases the initial selection area includes bidirectional text. In some cases the text selection input comprises a pointer-based input highlighting the initial selection area. In some cases the text selection input comprises keyboard-based input highlighting the initial selection area. In some cases the system further comprises a database configured to store logical indices associated with characters included in the initial selection area and the modified selection area.

Another example embodiment of the present invention provides a computer program product encoded with instructions that, when executed by one or more processors, cause a process for bidirectional text selection to be carried out. The process comprises receiving a text selection input that defines a text selection area that comprises one or more characters positioned between an unanchored side and an anchored side of the text selection area. Each of the one or more characters corresponds to a logical index. The process further comprises making a determination with respect to whether a list of logical indices corresponding to the text selection area is contiguous. Where the list of logical indices is noncontiguous, the process further comprises adding logical indices to the list to produce a contiguous list of logical indices. The process further comprises adjusting at least one of the unanchored and anchored sides of the text selection area based on the logical indices added to the list. In some cases the process further comprises (a) evaluating a side of the text selection area to determine if a glyph positioned at the side maps to a plurality of characters; and (b) where the glyph maps to a plurality of characters, adjusting the text selection area to exclude at least one of the plurality of characters to which the glyph is mapped. In some cases the text selection area includes bidirectional text. In some cases the text selection input comprises a Shift+Arrow keyboard input applied to an existing text selection area. In some cases the process further comprises storing the list of logical indices corresponding to the text selection area in a memory.

The foregoing detailed description has been presented for illustration. It is not intended to be exhaustive or to limit the disclosure to the precise form described. Many modifications and variations are possible in light of this disclosure. Therefore it is intended that the scope of this application be limited not by this detailed description, but rather by the claims appended hereto. Future filed applications claiming priority to this application may claim the disclosed subject matter in a different manner, any may generally include any set of one or more limitations as variously disclosed or otherwise demonstrated herein.

What is claimed is:

1. A method for bidirectional text selection comprising:
receiving a text selection input that modifies a text selection area and defines a text selection direction, wherein the text selection area comprises a plurality of characters positioned between an unanchored side and an anchored side of the text selection area;
adjusting the unanchored side of the text selection area in the text selection direction, wherein adjusting produces an initial modified selection area;
generating a noncontiguous list of logical indices corresponding to the initial modified selection area;
adding one or more intermediate logical indices to the noncontiguous list of logical indices to produce a modified list of logical indices that are contiguous; and
adjusting at least one of the unanchored and anchored sides of the text selection area based on the one or more intermediate logical indices added to produce the modified list.

2. The method of claim 1, wherein the text selection area comprises unidirectional text and the initial modified selection area comprises bidirectional text.

3. The method of claim 1, wherein both the text selection area and the initial modified selection area comprise bidirectional text.

4. The method of claim 1, wherein the text selection input comprises a Shift+Arrow key combination typed on a keyboard.

5. The method of claim 1, further comprising rendering a final modified selection area that corresponds to the modified list of logical indices that are contiguous.

6. The method of claim 1, wherein the text selection direction is rightward and the anchored side of the text selection area is adjusted leftward based on the intermediate logical indices added to produce the modified list.

7. The method of claim 1, wherein the text selection direction is leftward and the anchored side of the text selection area is adjusted rightward based on the intermediate logical indices added to produce the modified list.

8. The method of claim 1, further comprising:
evaluating an edge of the text selection area to determine if a glyph positioned at the edge of the text selection area maps to a plurality of characters represented by the glyph; and
modifying the text selection area to include less than all of the characters represented by the glyph positioned at the edge of the text selection area.

9. The method of claim 1, wherein the text selection input includes a first input that expands the text selection area and a second input that reduces the text selection area.

10. A system for bidirectional text selection that comprises a memory device and a processor that is operatively coupled to the memory device, wherein the processor is configured to execute instructions stored in the memory device, such instructions comprising:
- a text rendering module configured to render a plurality of characters, each of which is associated with a logical index;
- a user input module configured to receive a text selection input that defines an initial selection area, wherein the initial selection area includes an initial subset of the characters that corresponds to a noncontiguous set of logical indices; and
- a glyph selection module configured to
  - add one or more intermediate logical indices to the noncontiguous set of logical indices to produce a modified set of logical indices that are contiguous, and
  - add at least one of the characters to the initial selection area to produce a modified selection area, wherein the modified selection area includes a modified subset of the characters that corresponds to the modified set of logical indices that are contiguous;
- wherein the text rendering module is further configured to render the modified selection area in conjunction with the plurality of characters.

11. The system of claim 10, wherein the instructions further comprise a character selection sub-module configured to adjust the modified selection area by:
- evaluating an edge of the modified selection area to determine if a glyph positioned at the edge maps to a plurality of characters represented by the glyph; and
- adjusting the modified selection area to include less than all of the characters represented by the glyph.

12. The system of claim 10, wherein the initial selection area includes bidirectional text.

13. The system of claim 10, wherein the text selection input comprises a pointer-based input highlighting the initial selection area.

14. The system of claim 10, wherein the text selection input comprises keyboard-based input highlighting the initial selection area.

15. The system of claim 10, further comprising a database stored in the memory device, wherein the database is configured to store logical indices associated with characters included in the initial selection area and the modified selection area.

16. A non-transitory computer readable medium encoded with instructions that, when executed by one or more processors, cause a process for bidirectional text selection to be carried out, the process comprising:
- receiving a text selection input that defines a text selection area that comprises one or more characters positioned between an unanchored side and an anchored side of the text selection area, wherein each of the one or more characters corresponds to a logical index;
- making a determination with respect to whether a list of logical indices corresponding to the text selection area is contiguous;
- where the list of logical indices is noncontiguous, adding one or more intermediate logical indices to the noncontiguous list of logical indices to produce a contiguous list of logical indices; and
- adjusting at least one of the unanchored and anchored sides of the text selection area based on the one or more intermediate logical indices added to the noncontiguous list.

17. The non-transitory computer readable medium of claim 16, wherein the process further comprises:
- evaluating a side of the text selection area to determine if a glyph positioned at the side maps to a plurality of characters represented by the glyph; and
- adjusting the text selection area to exclude at least one of the characters represented by the glyph.

18. The non-transitory computer readable medium of claim 16, wherein the text selection area includes bidirectional text.

19. The non-transitory computer readable medium of claim 16, wherein the text selection input comprises a Shift+Arrow keyboard input applied to an existing text selection area.

20. The non-transitory computer readable medium of claim 16, wherein the process further comprises storing the noncontiguous and contiguous lists of logical indices in a memory.

* * * * *